L. DOWLER.
BOTTLE.
APPLICATION FILED FEB. 14, 1919.

1,321,016.

Patented Nov. 4, 1919.

INVENTOR
Lawrence Dowler
BY
Victor J. Evans
ATTORNEY

UNITED STATES PATENT OFFICE.

LAWRENCE DOWLER, OF DAYTON, OHIO.

BOTTLE.

1,321,016.   Specification of Letters Patent.   Patented Nov. 4, 1919.

Application filed February 14, 1919. Serial No. 277,069.

*To all whom it may concern:*

Be it known that I, LAWRENCE DOWLER, a citizen of the United States, residing at Dayton, in the county of Montgomery and State of Ohio, have invented new and useful Improvements in Bottles, of which the following is a specification.

This invention relates to bottles and the principal object of the invention is to provide means which will permit the bottle to be easily and quickly drained of its contents without removing the auxiliary closing means.

Another object of the invention is to provide a bottle neck with an enlarged part, the interior of which is formed as a valve seat and which is provided with emptying conduits in its walls for conveying the liquid around the valve.

The invention also consists in certain other features of construction and in the combination and arrangement of the several parts, to be hereinafter fully described and illustrated in the accompanying drawings and specifically pointed out in the appended claims.

In describing my invention in detail, reference will be had to the accompanying drawings wherein like characters denote like or corresponding parts throughout the several views, and in which.

Figure 1:
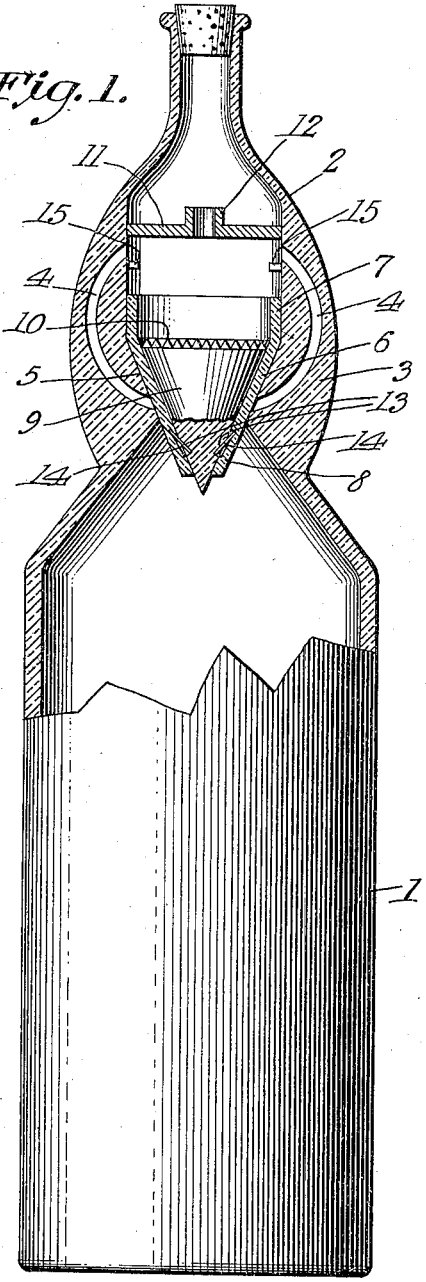
Figure 1 is a sectional view of a bottle made in accordance with the invention with the parts in closed position.
Figure 2:
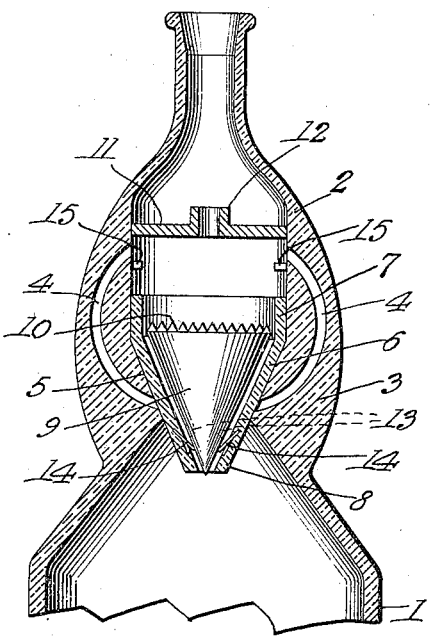
Fig. 2 is a sectional detail with the parts in position for filling the bottle.
Figure 3:
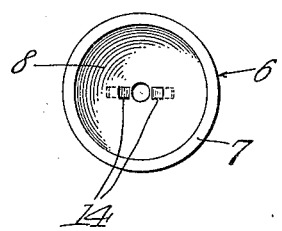
Fig. 3 is a detailed view.

In these views, 1 indicates a bottle, which is provided with an enlarged neck, indicated at 2. The walls of this neck are thickened as at 3, and such walls are provided with curved conduits 4, which have their upper and lower ends entering the passage in the neck. The upper part of this passage has its walls of cylindrical shape, while the lower part flares inwardly to provide a valve seat 5. The lower ends of the conduits are located on this seat. A large glass stopper 6 of hollow formation and provided with a cylindrical upper part 7 and a tapered lower part 8, fits in the passage and when in lowered position the tapered part will rest on the valve seat, so as to close the passage and also the lower ends of the conduits. The lower end of this valve stopper is open so as to permit the passage of liquid therethrough in filling the bottle. The valve stopper is closed by a small glass stopper 9 of conical shape with its base roughened or provided with projections, as at 10. These projections will engage with the closing member 11 to prevent the stopper 9 from closing the tubular projection 12, on said member 11, so as to permit the liquid to flow from the bottle when the same is inverted. The stopper 9 is held in position closing the valve stopper 6 by means of spring latches 13 engaging spring fingers 14 on said valve stopper 6.

If desired, I may locate baffle plates above the member 11 to prevent the entrance of articles inserted for the purpose of tampering with the interior parts.

The valve stopper is first inserted, then the small stopper 9 is dropped into the valve stopper and finally the member 11 is placed in position and sealed therein in any suitable manner. The bottle may be filled before the insertion of these parts, or it may be filled after these parts are inserted. After the bottle is filled the stopper 9 is forced downwardly so that the latches thereon will engage with the spring fingers and thus lock the stopper 9 in position, closing the passage through the valve stopper. When the liquid is to be removed from the bottle said bottle is tilted so that the valve stopper will move toward the bottle mouth, this movement being limited by the projections 15, so that the liquid will flow between the valve stopper and the valve seat and pass through the conduits and through the tubular part 12 to the bottle mouth.

Having described the invention, what is claimed is:

1. A bottle of the class described having a valve seat formed in its neck and conduits in its walls, a hollow valve engaging said seat and controlling said conduits and a filling valve fitting in said hollow valve.

2. A bottle of the class described having a valve seat formed in its neck and conduits in its walls, a hollow valve engaging said seat and controlling said conduits, a filling valve fitting in said hollow valve and means for locking the filling valve to the hollow valve.

3. A bottle of the class described having an enlarged neck with thickened walls, a hollow valve closing the neck and the lower ends of the conduits in its walls, a second valve fitting in the hollow valve, means for locking the second valve in position closing the hollow valve and a closing member having a tubular projection.

In testimony whereof I affix my signature.

LAWRENCE DOWLER.

Copies of this patent may be obtained for five cents each, by addressing the "Commissioner of Patents, Washington, D. C."